Figure 1:
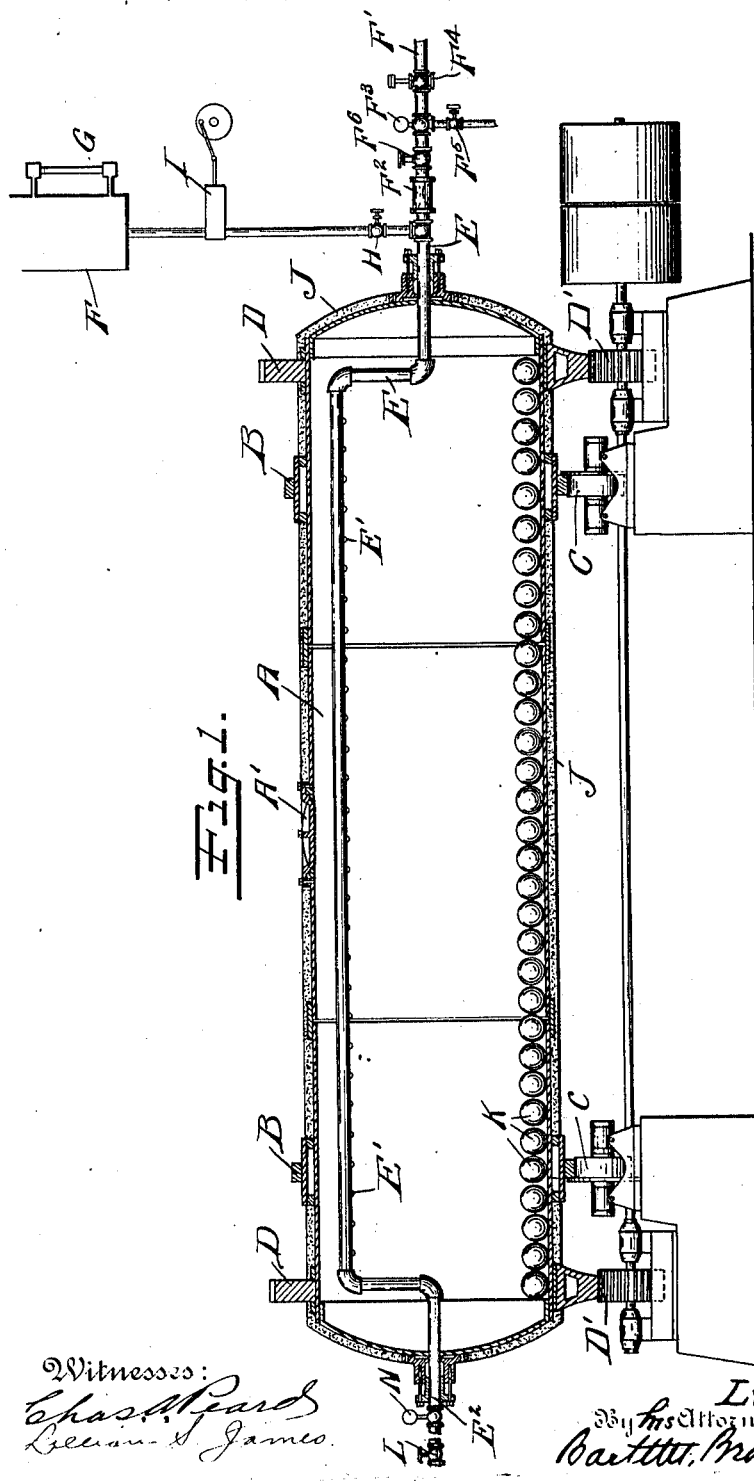

L. T. LEET.
METHOD OF HYDRATING LIME.
APPLICATION FILED AUG. 6, 1907.

955,814.

Patented Apr. 19, 1910
2 SHEETS—SHEET 1.

L. T. LEET.
METHOD OF HYDRATING LIME.
APPLICATION FILED AUG. 6, 1907.

955,814.

Patented Apr. 19, 1910.
2 SHEETS—SHEET 2.

Witnesses:
Chas. M. Beard
Lillian S. James

Inventor
Lynn T. Leet
By his Attorneys
Bartlett, Brownell, Mitchell

UNITED STATES PATENT OFFICE.

LYNN T. LEET, OF READING, PENNSYLVANIA, ASSIGNOR, BY MESNE ASSIGNMENTS, TO THORBURN REID, OF NEW YORK, N. Y.

METHOD OF HYDRATING LIME.

955,814.  Specification of Letters Patent.  Patented Apr. 19, 1910.

Application filed August 6, 1907. Serial No. 387,253.

*To all whom it may concern:*

Be it known that I, LYNN T. LEET, residing at Reading, Berks county, Pennsylvania, have invented certain new and useful Improvements in Methods of Hydrating Lime, of which the following is a full, clear, and exact description.

My invention relates to improvements in methods of hydrating lime whereby the heat generated by the hydration is utilized to assist in the perfect hydration of the lime and its delivery in a dry state, the temperature being maintained and the heat conserved until the hydration is completed.

In hydrating lime in accordance with my invention the moisture is supplied in such form and quantity that the heat developed by the hydration of the lime will be sufficient to maintain as dry steam any uncombined moisture that may be present and will be so conserved as to maintain the pressure of the dry steam, preferably in the neighborhood of 100 lbs. per square inch gage pressure, until the steam is allowed to escape after the hydration is completed. By maintaining the pressure at this point, the moisture is made to permeate the lime more quickly and completely resulting in a thorough hydration. Moreover the excess moisture will have or will assume the form of dry steam thus avoiding the formation of balls or cakes of lime into which it is difficult for the moisture to penetrate. Heretofore in hydrators and processes of hydrating lime the great difficulty has been to thoroughly hydrate the lime and to avoid at the same time the production of a wet and pasty mass at the end of the hydration. If the hydrated lime is wet, it not only cakes so as to stick to the hydrator and interfere with the use of the hydrator in a subsequent operation, but it is impossible to thoroughly mix the wet hydrated lime with sand or other ingredients with which it is to be subsequently used. For such a thorough mixture the hydrated lime must be in the form of a dry powder.

Lime which is only partially hydrated may be in the form of a powder and yet be entirely unsuitable for use in making bricks, blocks, plaster and the like, since when such partially hydrated lime is mixed with the proper ingredients and molded into form, and moisture added to the mixture in the form of water or steam, some or all of the unhydrated lime present will be hydrated, will swell and will disintegrate or crack the product, thus making it imperfect and unsatisfactory and practically uncommercial. The proper hydration of the lime is, therefore, very important, and in fact is an absolutely essential requirement for the manufacture of satisfactory sand-lime bricks and the like.

By my invention perfectly hydrated lime in a dry and powder-like form can be obtained and thus the difficulties above referred to be avoided.

One important feature is the use of a heat insulating covering for the hydrating cylinder whereby heat within the cylinder may be conserved. Heretofore the importance of conserving the heat within the cylinder has not been recognized, but I have found that unless it is done, it is practically impossible to secure satisfactory results, since complete hydration of large quantities of lime requires several hours, and the excess moisture at the end of that time must be in the form of dry steam so that it can be discharged. If the steam is allowed to condense before the vent is opened the hydrated lime will not be dry. The moisture may be supplied in various ways such as in the form of water or steam, or partly water and partly steam, but I prefer to supply it in the form of water where conditions permit, since in this way a plant for separately generating heat is avoided. When the moisture is supplied in the form of water the heat required to convert the excess into superheated steam is all supplied by the hydration. When the properties or qualities of the lime or the presence of impurities retard the process of hydration or reduce the amount of heat developed to such an extent that when moisture is introduced in the form of cold water, sufficient heat is not developed with such rapidity as to convert the excess of moisture present into dry steam, the deficiency of heat may be supplied by warming the water or converting some or all of it into steam before introducing it into the hydrator. This allows of the introduction of a larger amount of excess moisture than would be feasible if cold water alone were used. Thus is avoided the difficulty and expense of accurate measurement of the amount of moisture and lime introduced and it becomes possible to introduce sufficient moisture to insure perfect hydration of all the lime that may be present in any charge and yet avoid the danger of condensed moisture being present at the end of the hydration period with a charge of lime requiring a less amount of moisture by reason of an excess of impurities or deficient weight. When the moisture is supplied in the form partly of steam and partly of water, the most advantageous time to begin to supply the steam will depend on the way in which the lime hydrates, different samples of lime varying widely in the rate at which they hydrate at different parts of the hydration period and the proportions of steam and water to be used and the best time to introduce the steam should be determined by trial with samples of the lime to be hydrated. When the moisture is supplied partly in the form of steam, the last part of the moisture is preferably introduced in that form. In whatever form the moisture is supplied great care must be taken to conserve the heat within the vessel until the hydration cylinder is vented so as to prevent any condensation therein of moisture in excess of that taken up in the hydration.

The following is a description of an apparatus adapted to carry out my process, reference being had to the accompanying drawings.

Figure 2:
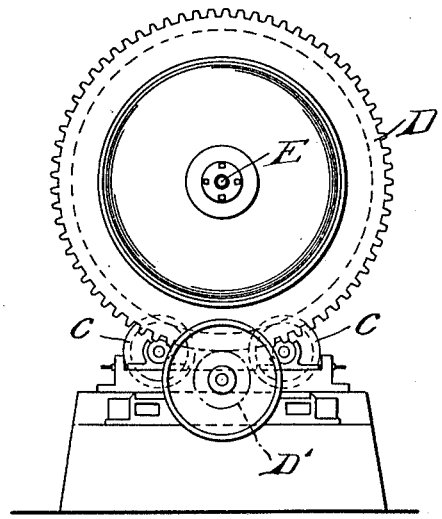

Figure 1 shows a longitudinal section of a hydrator for carrying out my invention; Fig. 2 shows a vertical cross section of the same.

Referring more particularly to the drawings, A is a closed metallic cylinder or vessel in which the hydration takes place.

A' is a cover closing a manhole in the side of the cylinder. The cylinder is provided with circular projections B—B which are supported by anti-friction wheels C—C. Gears D—D are carried at each end of the cylinder, and the cylinder is revolved by power applied thereto through pinions D'—D'. An inlet pipe E provided with sprinkler openings E' and an outlet pipe E² pass respectively through the cylinder heads for supplying moisture to the inside of the hydrator and permitting the escape of steam. A tank F is connected to this inlet pipe, the same being provided with a gage G for determining the level of the water therein. A steam connection F' is also provided for supplying steam through the inlet pipe.

F² is a nozzle for measuring the amount of steam admitted.

F³ is a pressure gage on the boiler side of the nozzle and F⁴ is a stop cock for controlling the supply of steam.

F⁵ is a stop cock in a drain pipe.

F⁶ is a check valve. A stop cock H is interposed between the tank and the pipe so that the supply of water to the hydrator can be cut off when the gage shows that the desired amount has been introduced. This stop cock also serves to regulate the supply of water to the hydrator, so as to maintain a proper pressure within the cylinder. Suitable means such as a pump I is interposed between the tank and the hydrator for forcing the water into the hydrator against pressure in the hydrator during the hydration process.

In order to conserve the heat introduced with the moisture as well as that generated within the hydrator by the hydration of the lime, a heavy covering of insulating material J is provided to prevent the loss of this heat. This covering of insulating material should be thick enough to prevent any substantial or material loss of heat for a period of two or three hours, that being the time which in some instances necessarily elapses before complete hydration of lime takes place. In order to assist in the hydration I provide pebbles or metal balls K within the hydrator which serve to grind up the lime thus exposing all portions of it more rapidly to the moisture within the hydrator, and reducing to a fine powder any impurities that may be present or any portions of the lime not reduced to powder by the hydration process itself.

L is a cock for controlling the escape of steam after hydration is completed. The usual safety valve and a pressure gage N showing the pressure within the cylinder, are connected to the pipe E between the cylinder and the valve L.

In carrying out my process with the above described apparatus, I first introduce into the cylinder A a suitable weighed or measured quantity of unslaked lime, the quality of the lime and the time and the amount of water which theoretically would be necessary to produce complete hydration of the entire amount within the hydrator having been ascertained. After the manhole is closed by the cover A', I start the hydrator in motion and let in an amount of water from the tank corresponding to an amount equal to about 10 or 20 per cent. more than the amount computed to be necessary for the complete hydration, the rule being that the excess of moisture over that required for complete hydration shall be so slight as not to be more than that which, after hydration is completed, will remain in the form of dry superheated steam. This water I let in at a rate corresponding to the quality of the lime, it being necessary to let the water in more slowly with a slowly hydrating lime than with a rapidly hydrating lime. With a rapidly hydrating lime, however, it is necessary not to let the water in so rapidly as to cause the pressure within the hydrator to rise unduly. I prefer that the pressure should be maintained as nearly as possible at 100 lbs. If the pressure is permitted to rise unduly, it will either result in bursting the cylinder of the hydrator or will result in forcing off some of the moisture through the safety valve. When moisture is forced off through the safety valve it not only results in the loss of heat, but it is impossible to tell how much moisture has escaped, and it might be that sufficient moisture has escaped so that the remaining moisture will not completely hydrate the lime. The safety valve, therefore, is present only for protection in the case of emergency and should never be called into use in the normal use of the apparatus. In an apparatus for hydrating a charge of 8000 pounds the charge should preferably fill one-third of the cylinder and the time required to let the water in under ordinary circumstances varies from one to one and one-half hours, according to the quality of the lime. The hydrator is kept in motion for a considerable period even after the water has been thus admitted until the lime is completely hydrated, this second period usually varying from one to one and one-half hours, making two or three hours for the whole operation. During all this time by reason of conservation of heat the steam pressure due to the hydration is maintained substantially constant within the hydrator and this steam forces the moisture to permeate the mass completely, large lumps being broken up by the balls so as to facilitate hydration, the balls also serving to pulverize any impurities or hydrated portions not reduced to a powder by the hydration itself. In this way complete hydration takes place within the shortest possible time.

At the end of the period of hydration the pressure should be substantially the maximum above referred to. At this point and before the hydrator has cooled off and the pressure been substantially reduced, the superheated steam within the hydrator should be permitted to escape as rapidly as possible without carrying an excessive amount of the lime with it. When the steam has all escaped it will be found that the lime within the hydrator will be perfectly hydrated and yet be perfectly dry and in condition to be mixed with the proper ingredients for making sand-lime bricks and the like.

The water must be admitted at so slow a rate that there will never be in the vessel more uncombined water than the heat of hydration, less what is necessarily lost by radiation, is capable of converting into superheated steam, and preferably the water, except as it is converted into steam, should be absorbed chemically as fast as it is introduced.

It has heretofore been suggested that lime can be properly hydrated in a closed chamber by introducing exactly the amount of water necessary to produce complete hydration and preventing the escape of steam during the hydration process. While this might theoretically produce dry and completely hydrated lime, it is open to the objection that it is impossible to determine accurately the amount of water which will be necessary to completely hydrate a large amount of commercial lime, since a slight error in the test would result in the use of improper proportions. Different samples of lime even when taken from the same quarry or the same kiln vary widely in their requirements and it is difficult, if not impossible, in practical commercial work at least, to weigh or measure the lime and moisture with sufficient accuracy to avoid having at any time an excess of moisture resulting in wet lime or an excess of lime resulting in incomplete hydration. Moreover, unless the moisture is introduced in the proper proportions of water and steam and at the proper rate, the pressure is liable to rise so high as to cause loss of steam through the safety valve with the result that the moisture remaining in the hydrator is insufficient for perfect hydration. It is, therefore, of great advantage to use an excess of water during the hydration process and to get rid of that excess at the end of hydration process, and that is the result which I have accomplished.

The maintenance of the steam pressure at or near 100 lbs. to the square inch by conserving the heat in the hydrator until the steam is blown off after the hydration is completed besides facilitating the hydration process has also another great advantage in that it allows of the introduction of a much larger excess of moisture without risk of wet lime being delivered than would be possible at a very low steam pressure. The higher the pressure of the steam the higher its temperature and the higher, therefore, will be the temperature of the hydrator itself and of the lime it contains. If there is any water or condensed steam present, this will also be at the temperature of the steam. When then the steam is blown off at the end of the hydration process, the pressure is lowered, the heat in the vessel, however, being only slightly reduced, since the greater part of it remains in the lime, the water and the vessel itself. All the heat in the vessel which is between the temperature of steam at atmospheric pressure (212° Fahr.) and at 100 lbs. pressure (388° Fahr.) is available then to convert into steam any water that may be present. The limiting pressure of 100 lbs. is adopted in practice on account of the great increase in cost of the hydration cylinder that would result from the use of higher pressures.

What I claim is:

1. The process of hydrating lime which consists in subjecting a quantity of lime in a closed vessel to slowly admitted moisture slightly in excess of that required for complete hydration of the lime, conserving the heat within the vessel so that the excess of moisture will be kept in the form of superheated steam under high pressure until all the lime is hydrated and then discharging the steam while still superheated.

2. The process of hydrating lime which consists in subjecting a quantity of lime in a closed vessel to slowly admitted moisture slightly in excess of that required for complete hydration of the lime, conserving the heat within the vessel so that the excess of moisture will be kept in the form of superheated steam under high pressure until all the lime is hydrated and then discharging the steam while still superheated, the lime being kept in commotion during the period in which hydration is going on.

3. The process of hydrating lime which consists in subjecting a quantity of lime in a closed vessel to slowly admitted moisture slightly in excess of that required for complete hydration of the lime, conserving the heat within the vessel so that the excess of moisture will be kept in the form of superheated steam under high pressure until all the lime is hydrated and then discharging the steam while still superheated, the lime being subjected to a grinding action during the period in which hydration is going on.

4. The process of hydrating lime which consists in subjecting a quantity of lime in a closed vessel to slowly admitted moisture slightly in excess of that required for complete hydration of the lime, conserving the heat within the vessel so that the excess of moisture will be kept in the form of superheated steam under high pressure until all the lime is hydrated and then discharging the steam while still superheated, the lime being subjected to the grinding action of bodies of greater durability while hydration is going on.

5. The process of hydrating lime which consists in subjecting a quantity of lime in a closed vessel to slowly admitted water slightly in excess of that required for complete hydration of the lime, conserving within the vessel the heat generated by hydration, and thereby maintaining the excess water in the form of superheated steam until the lime is completely hydrated and then discharging the steam while still superheated.

6. The process of hydrating lime which consists in subjecting a quantity of lime in a closed vessel to a definite amount of moisture slightly in excess of that required for complete hydration and admitted at such a rate as to maintain within the vessel when the heat is conserved superheated steam at an approximately constant high pressure until the lime is completely hydrated, conserving the heat during the hydration period, and when hydration is completed discharging the free moisture in the form of steam while still superheated.

7. The process of hydrating lime which consists in subjecting a quantity of lime in a closed vessel to an amount of moisture slightly in excess of that required for hydration of the lime, said moisture being admitted at such a rate as to maintain within the vessel, when the heat is conserved, superheated steam at an approximately constant high pressure, preventing the substantial escape of moisture during the hydration period and then discharging the steam while still superheated.

LYNN T. LEET.

Witnesses:
O. S. DE TURCK,
ELMER W. DECK.